& Mortimer

(12) United States Patent
Haker et al.

(10) Patent No.: US 9,058,661 B2
(45) Date of Patent: Jun. 16, 2015

(54) METHOD FOR THE REAL-TIME-CAPABLE, COMPUTER-ASSISTED ANALYSIS OF AN IMAGE SEQUENCE CONTAINING A VARIABLE POSE

(75) Inventors: Martin Haker, Lübeck (DE); Erhardt Barth, Ratekau/Ovendorf (DE); Thomas Martinetz, Lübeck (DE)

(73) Assignee: Universitat Zu Lubeck, Lubeck (DE)

( * ) Notice: Subject to any disclaimer, the term of this patent is extended or adjusted under 35 U.S.C. 154(b) by 291 days.

(21) Appl. No.: 13/319,968

(22) PCT Filed: May 6, 2010

(86) PCT No.: PCT/DE2010/000506
§ 371 (c)(1),
(2), (4) Date: Nov. 10, 2011

(87) PCT Pub. No.: WO2010/130245
PCT Pub. Date: Nov. 18, 2010

(65) Prior Publication Data
US 2012/0120073 A1 May 17, 2012
US 2014/0098093 A2 Apr. 10, 2014

(30) Foreign Application Priority Data
May 11, 2009 (DE) .......................... 10 2009 020 732

(51) Int. Cl.
*G06T 17/00* (2006.01)
*G06T 7/00* (2006.01)
*G06K 9/00* (2006.01)

(52) U.S. Cl.
CPC .......... *G06T 7/0046* (2013.01); *G06K 9/00355* (2013.01)

(58) Field of Classification Search
None
See application file for complete search history.

(56) References Cited

U.S. PATENT DOCUMENTS 5,670,719 A * 9/1997 Madsen et al. .................. 73/619
6,181,343 B1 * 1/2001 Lyons ........................... 715/850

(Continued)

OTHER PUBLICATIONS

Pia Breuer et al., "Hand Gesture Recognition with a Novel IR Time-of-Flight Range Camera A Pilot Study", Mar. 28, 2007, pp. 247-260, XP019078190.

(Continued)

*Primary Examiner* — Kimbinh T Nguyen
*Assistant Examiner* — Raffi Isanians
(74) *Attorney, Agent, or Firm* — Wood, Phillips, Katz, Clark & Mortimer

(57) ABSTRACT

The invention relates to a method for the real-time-capable, computer-assisted analysis of an image sequence of an object consisting of elements that can be moved relative to each other and are interconnected, said sequence containing a variable pose, wherein the individual images of the image sequence are recorded by way of a time-of-flight (TOF) camera such that said images can be processed by a computer, and contain brightness and distance data as functions of the pixel coordinates of the camera for each image of the sequence, comprising the following steps: a. Capturing the pixels of an individual image forming the object, b. calculating a three-dimensional (3D) point cloud in a virtual space, said point cloud representing the surface of the object that is visible to the camera, by a computational projection of object-depicting pixels in such a space, while taking captured distance data to the object into consideration, c. fitting a model of the object consisting of nodes and edges into the computer-generated 3D point cloud for the individual images, wherein the nodes represent a selection of elements of the object and the edges represent the connections of said elements amount each other, d. iteratively updating all node positions by applying a learning rule for training a self-organizing map having a previously defined number of randomly selected dots of the point cloud, e. repeating steps a. to d. for each subsequent individual image of the sequence, wherein for the fitting in step c. the result of step e. of the preceding image is used in each case, and f. determining the varying pose from the positions of predetermined nodes of the model which have been captured in at least representative images of the image sequence.

14 Claims, 4 Drawing Sheets

(56) References Cited

U.S. PATENT DOCUMENTS

| | | | |
|---|---|---|---|
| 2003/0132950 A1* | 7/2003 | Surucu et al. | 345/700 |
| 2008/0225041 A1* | 9/2008 | El Dokor et al. | 345/419 |
| 2009/0202114 A1* | 8/2009 | Morin et al. | 382/118 |
| 2010/0079385 A1* | 4/2010 | Holmgren et al. | 345/173 |
| 2010/0225595 A1* | 9/2010 | Hodges et al. | 345/173 |

OTHER PUBLICATIONS

Wunsch P. et al., "Real-time pose estimation of 3D objects from camera images using neural networks", Apr. 20, 1997, Robt. pp. 3232-3237, XP010235459.

Haiying Guan et al., "The Isometric Self-Organization Map for 3D Hand Pose Estimation", Apr. 10, 2006, pp. 263-268, XP010911565.

Malassiotis S. et al., "Real-time hand posture recognition using range data", Image and Vision Computing, Jul. 2, 2008, vol. 26, No. 7, pp. 1027-1037, XP022618942.

Martin Haker et al., "Self-Organizing Maper for Pose Estimation with a Time-of-Flight Camera", Sep. 9, 2009, Dynamic 3D Imaging, pp. 142-153, XP019126929.

Palagyi K. et al., "A Parallel 3D 12-Subiteration Thinning Algorithm", Graphical Models and Image Processing 61, 199-221 (1999).

Yang H. et al., "Reconstruction of 3D human body pose from stereo image sequences based on to-down learning", Pattern Recognition 40 (2007) 3120-3131.

Rosales R. et al., "Inferring Body pose without Tracking Body Parts", Proc. IEEE Computer Vision and Pattern Recognition, Jun. 2000.

The International Search Report issued in PCT/DE2010/000506 of which the above-captioned application is the US National Phase.

* cited by examiner

METHOD FOR THE REAL-TIME-CAPABLE, COMPUTER-ASSISTED ANALYSIS OF AN IMAGE SEQUENCE CONTAINING A VARIABLE POSE

FIELD OF THE INVENTION

The invention relates to a method for a real-time-capable computer-assisted continuous analysis of an image sequence containing a variable pose of an object composed of interconnected elements movable in relation to each other.

The invention specifically relates to the estimation of the positions and orientations of the trunk and extremities of a living person who moves during the image sequence, i.e. the estimation of a human body pose.

BACKGROUND OF THE INVENTION

The estimation of the human pose in three dimensions (3D) has been studied in a number of scientific papers. Some of these papers have focused on the reconstruction of the human pose from 2D data acquired by a conventional camera.

In Agarwal A and Triggs B, *Recovering* 3D *Human Pose from Monocular images*; IEEE Transactions on Pattern Analysis and Machine Intelligence, 28 (1) (2006) 44-58, the pose is obtained from shape descriptors of silhouettes of the human body.

The authors Rosales R and Sclaroff S of *Inferring Body Pose without Tracking Body Parts*; Proceedings of Computer Vision and Pattern Recognition (2000) 721-727, map simple visual features of a segmented body onto a series of possible configurations of the body and identify the pose by the configuration which is most probable in view of the given visual features.

A further approach in Shakhnarovich G, Viola P and Darrell T, *Fast Pose Estimation with Parameter-Sensitive Hashing*, Proceedings of the International Conference on Computer Vision (2003) 750-757, uses a large data base of exemplary images of human poses and the authors use parameter-sensitive hashing functions by which the exemplary pose which is most similar to a given pose is searched in the data base.

A major disadvantage of all of the methods based on 2D data is that the segmentation of the person whose pose is to be estimated is difficult, in particular in scenes with a complex background. Last but not least, this is at the sacrifice of processing power and hence to speed.

Another problem of 2D images is the detection of extremities directed at the camera but hide part of the upper part of the body in the 2D projection. In such a situation, the extremities can no longer be detected in the silhouette and detection becomes time-consuming.

A pose estimation based on 3D data is described, for example, in Weik S and Liedtke C-E, *Hierarchical* 3D *Pose Estimation for Articulated Human Body Models from a Sequence of Volume Data*; Proc. of the International Workshop on Robot Vision (2001) 27-34. Here, the 3D volume of a person is acquired by means of a multi-camera configuration using the shape-from-silhouette method. Subsequently, a 2D projection of the volume is calculated by means of a virtual camera and a model of the human skeleton is adapted to this projection. To estimate the 3D pose, the model of the skeleton is then retransferred into the 3D space by inverting the 2D projection.

The disadvantages of the method of Weik and Liedtke are that the acquisition of the 3D volume has to be carried out within a special device having multiple cameras in front of a uniformly green background and the calculation of the 3D volume is a time-consuming technique.

A further approach for the calculation of a 3D skeleton model is to thin out volumetric data directly within the three-dimensional space [Palagyi K and Kuba A, *A Parallel* 3D 12-*Subiteration Thinning Algorithm*; Graphical Models and Image Processing, 61 (4) (1999), 199-221]. The human pose can then be estimated by means of the skeleton model.

A method for pose estimation based on stereoscopy was published by Yang H-D and Lee S in *Reconstructing* 3D *Human Body Pose from Stereo Image Sequences Using Hierarchical Human Body Model Learning*; ICPR '06: Proceedings of the 18th International Conference on Pattern Recognition (2006) 1004-1007. The authors introduce a hierarchical model of the human body. Both the silhouette and the depth information are used for a given photograph to find the pose with the best match in the data base.

A disadvantage of this approach is the technique of stereoscopy which involves a long processing time. In addition, stereoscopy provides reliable depth data only if the respective scene has a sufficient texture.

A pose estimation by means of a self-organizing map (SOM) is described by Winkler S, Wunsch P and Hirzinger G in *A Feature Map Approach to Real-Time* 3D *Object Pose Estimation from Single* 2D *Perspective Views*; Mustererkennung 1997 (Proc. DAGM) (1997), 129-136.

A SOM is a special neural network which can be trained for a task. The SOM is used here to learn a map of a 64-dimensional feature space into the three-dimensional space of possible rotations of a rigid object. Artificially generated views of the rigid object are used as the training data. 2D color photographs of the object form the basis of the application of this method. Based on the color information, the object is localized within the images and is cut out. Subsequently, the image is processed by a Sobel operator which is responsive to sudden differences in contrast within the image, so-called edges, and high pixel values are allocated to respective regions. In contrast, pixel values close to zero are allocated to uniformly colored regions. Finally, an image of 8×8 pixels, whose 64 values correspond to the feature vector, is generated from this edge image by reducing the resolution. The SOM three-dimensionally maps the resulting feature vector onto one of 360 possible orientations.

The disadvantages of the method of Winkler et al include the fact that this method exclusively treats rigid objects and therefore cannot be used for the 3D estimation of the human pose. In addition, this method is essentially based on the extraction of edge information by means of the Sobel operator. In the case of persons who normally wear different clothes and are photographed in complex natural scenes under varying conditions of illumination, it can be assumed that a unique representation based on edge information is not possible.

Another alternative for pose estimation is based on time-of-flight (TOF) cameras. A 3D TOF camera does not only provide a brightness image as usual cameras do, but can additionally measure the distance from the object. The camera emits infrared light which is modulated sinusoidally. In each pixel, the phase shift between the emitted light and the light reflected from the object is measured. From this phase shift, the time of flight of the light and hence the distance of the camera from the object point can be calculated. A TOF camera provides a depth edge which is perfectly registered with a brightness image (often referred to as "amplitude presentation" in the TOF nomenclature). Therefore, it is an attractive sensor for a large number of applications in image processing. A TOF camera produces only a 2½-dimensional image of the scene but this is done at a high image rate and without needing any additional computing time.

In Zhu Y, Dariush B and Fujimura K, *Controlled Human Pose Estimation from Depth Image Streams*; CVPRW '08 IEEE Computer Society Conference on Computer Vision and Pattern Recognition Workshops (2008), 1-8, a number of anatomical landmarks is three-dimensionally traced over time. The pose of a movable human model is estimated from the three-dimensional positions of these landmarks. The model is in turn used to resolve ambiguities in the detection of the landmarks as well as to produce estimations of the position of undetected landmarks. The method of Zhu et al simulates basic conditions such as the maximum bending angles of the joints and the avoidance of the mutual penetration of various parts of the body, amongst other things. Despite the complexity of the model, the method runs at a frame rate of at least 10 frames per second.

However, as conventional video sequences have a frame rate of 25 Hz, a real-time-capable pose estimation at an appropriate frame rate would be desirable. It is, however, the general object of the invention to make image information (color values on pixels) interpretable for machines after they have been electronically recorded or translated. The estimation of human poses is a subfield of computer vision which basically has two problems:
(1) The pose has to be determined rapidly and has to be updated rapidly in the event of a change. Here, a video rate of 25 Hz is desirable.
(2) The person whose pose is to be determined is usually not in an ideal environment but rather in front of an unknown or at least hardly controllable background.

In addition, the instrumentation expenditure for the solution of the task should not be too large. A common PC and a relatively simple camera configuration should be sufficient.

Well-known from prior art are TOF cameras which allow to solve the problem of the separation of foreground and background in a particularly simple manner. A TOF camera produces a 2.5-dimensional image (2 dimensions plus distance from the camera). Object points which are hidden by other object points along the line of sight of the camera cannot be detected. Of an object, only its front visible surface is available as an aggregate of points in the 3D space for inferring the pose of the 3D object.

In the above-mentioned paper of Weik S and Liedtke C-E, *Hierarchical 3D Pose Estimation for Articulatd Human Body Models from a Sequence of Volume Data*; Proc. of the International Workshop on Robot Vision, 2001, no TOF camera is used but not less than 16 electronic cameras are used and a monochromatic background is needed to three-dimensionally model a person by means of his or her silhouettes from different directions.

In the paper of Haker M, Böhme M, Martinetz T and Barth E, *Deicitc gestures with a time-of-flight camera*; The 8th International Gesture Workshop, Feb. 25-27, 2009, at the ZiF (Center for Interdisciplinary Research) at the Bielefeld University, Germany, a TOF camera is used to rapidly detect a person in front of an arbitrary background. However, the interpretation of the "pose" is almost rudimentary and they write, for example: "We find the head and hand using a simple but effective heuristic: The initial guess for the hand is the topmost pixel in the leftmost pixel column of the silhouette; the head is the topmost pixel in the tallest pixel column."

In other words: No matter which part of the body is farthest to the right within the image, the machine regards that part as the right hand. Actually, the use of this very simple pose estimation requires that the person always holds his or her right arm clearly away from the body if he or she wants to command the machine by moving that hand, for example. The approach described here cannot use gestures such as arms folded in front of the body.

Finally, the article of Breuer P, Eckes C and Müller S, *Hand Gesture Recognition with a Novel IR Time-of-Flight Range Camera—A Pilot Study*; Proceedings of the Mirage 2007, Computer Vision/Computer Graphics Collaboration Techniques and Applications, Rocquencourt, France, Mar. 28-30, 2007, pp 247-260, is intended to determine the pose of a human hand as rapidly and exactly as possible from an aggregate of points detected by a TOF camera. It uses an anatomical model of the hand, which is fit into a portion of the aggregate of points, which had been isolated in advance as representing the hand.

This paper determines seven degrees of freedom (3 coordinates, 3 angles of rotation, 1 scaling factor) to obtain the best possible fit (minimization of the cost function K). Here, the hand model itself is rigid and is not changed at any time. A rotation, for example, has an effect on all nodes of the hand model at the same time without shifting the model nodes in relation to each other.

The method described there might produce a good estimation of the person and of the twist of his or her hand within the 3D space. But as soon as the person to be estimated moves his or her fingers distinctly, the method would not work any longer without any problem.

BRIEF SUMMARY OF THE INVENTION

Just at this point, the present invention goes beyond the prior art. The present invention also uses a model which has to be fit into the aggregate of points representing the person. However, the (skeleton) model is simple and is at the same time flexible in itself. The model node positions themselves, and not only global shifts and twists in relation to the aggregate of points such as in D1, are the subject of the fitting procedure. In this case, the neighborhood structure of the nodes of the skeleton model is maintained throughout the fitting process so that particular nodes of the model necessarily represent the trunk, the head and the arms, respectively. The amazing result is that even movements of the arms in front of the body, in particular also the folding of the arms, can be detected clearly and in real time (at video frequency; cf. FIG. 4 of the description). The continuous updating of the node positions from the preceding images makes this complex movement detectable for the machine. In this case, the updating rule corresponds to that of a self-organizing map (SOM, standard algorithm of the neural network theory, which is also explained in detail in this application) which is integrated here for the first time into the task of the estimation of the pose of an object which is not rigid in itself in order to map its—unforeseeable—movements onto a record which can be processed by machines.

It is, therefore, the problem of the invention to provide a method for pose estimation by means of a TOF camera, which allows a continuous image analysis and pose calculation at at least 25 frames per second.

This problem is solved by a method having the features of the independent claim. The dependent claims relate to advantageous embodiments. The method for a real-time-capable computer-assisted analysis of an image sequence containing a variable pose of an object composed of interconnected elements movable in relation to each other, the frames of the image sequence having been recorded by a time-of-flight (TOF) camera so that they can be processed by a computer and having brightness and distance data as functions of pixel coordinates of the camera for each frame of the sequence, comprises the following steps: detecting the pixels of a frame, which map the object; calculating a three-dimensional (3D) aggregate of points within a virtual space, which represents that surface of the object which is visible for the camera, by calculated projection of object-mapping pixels into such a space, taking into account acquired data of a distance from the object; fitting a model of the object, which consists of nodes and edges, into the computer-generated 3D aggregate of points for the frame, the nodes representing a selection of elements of the object and the edges representing interconnections of these elements; iteratively updating all node positions by using a learning rule to train a self-organizing map with a predetermined number of randomly sampled points of the aggregate of points; repeating the steps (a) through (d) for each subsequent frame of the sequence, the result of step (e) of the preceding frame being used respectively for the fitting process in step (c); and finally, (f) determining the changing pose from positions of predetermined nodes of the model, which have been detected in at least representative frames of the image sequence. More specifically, this method combines the use of a TOF camera with the process of fitting a simplified skeleton model into a 3D aggregate of points, which represents the front side of the person to be estimated, this fitting process being able to be updated in a real-time-capable manner, because it is implemented by a learning algorithm for a SOM.

The advantage of the high speed of image segmentation by the TOF camera and the rapidly calculable SOM-updating rule allow a reliable pose estimation at up to 25 frames per second on a 2.0 GHz PC with only a minimum programming and computing expenditure.

Advantageously, the camera pixels onto which the object is mapped are determined by an image segmentation of the image sequence of the TOF camera. Further advantageously, two threshold values for brightness and depth data of the TOF camera are also determined for each frame and a contiguous region of camera pixels is identified, whose measurement data are larger than the brightness threshold value and less than the depth threshold value. These brightness data may then be advantageously evaluated in channels in the form of a histogram so that two accumulation points can be identified and the brightness threshold value is set in such a way that it is between the accumulation points.

The depth data may also be selected by using a depth threshold value in such a way that it [the depth threshold value] is between the accumulation point of the lowest depth and the other ones. Advantageously, the node positions of the model will be updated in iteration steps, one point x being randomly sampled for the predetermined number of points of the 3D aggregate of points in each iteration step and all nodes being shifted towards x, the degree of the shift being largest for the node which had the smallest distance from x prior to the iteration step. To this end, the degree of the shift of all nodes is determined in such a way that it decreases with the number of iteration steps if required. The number of the randomly sampled points x or of the iteration steps is then 10% of the total number of the points within the aggregate of points, for example.

It is further advantageous that prior to each iteration step, for the first node having the smallest distance from the sampled point x, a second node is selected, which is a neighbor of the first node and whose distance from the first node does not exceed a predetermined value during the shift of the nodes.

BRIEF DESCRIPTION OF THE DRAWINGS

The invention will now be described in detail with reference to the drawings, where.

DETAILED DESCRIPTION OF THE INVENTION

The first step of the method according to the invention is to separate (to segment) the human body from the background of the frame. To do so, a simple threshold method is used, which utilizes both the depth map and the amplitude presentation. The brightness and depth values recorded by the TOF camera are respectively entered in a histogram. The threshold values for the two frames are adaptively determined by means of the histograms for each frame as will be explained in the following.

Figure 1:
FIG. 1 illustrates an exemplary photograph of a test person, which was taken by a TOF camera. The upper image shows the amplitude data, the central one shows the depth map and the bottom one shows the resulting segmented image.

In the case of the amplitude presentation (cf. at the top of FIG. 1.), the pixel value corresponds with the light intensity of the active IR illumination of the TOF camera, which comes back from the scene into the camera. The amplitude presentation may also be regarded as a measure of confidence in the measured values of the depth map, as it is directly connected with the signal-to-noise ratio of the measurement. The attenuation of the amplitude is proportional to the squared distance of the object from the camera. Therefore, objects which are close to the camera usually appear markedly brighter than objects of the background.

To find an adaptive threshold value which separates the background from the foreground, the same is determined on the assumption that the histogram of the brightness values has exactly two essential maxima around which each of the numbers of brightness values follow approximately a Gaussian distribution. Under these circumstances, one speaks of a bimodal distribution, and the threshold value is selected in such a way that it separates the two distributions from each other as good as possible. A more precise segmentation on the basis of a threshold value for the amplitude presentation alone is generally difficult, as different objects may also have different reflecting characteristics for infrared light.

In the case of the depth map (in the middle of FIG. 1), the assumption of a bimodal distribution is broken in the histogram of the depth values if multiple objects exist at different distances in front of the camera. It is, therefore, assumed that each maximum in the histogram corresponds with an object if the objects actually exist at different distances in front of the camera. The threshold value used for the segmentation is determined as that one which separates the maximum of the object closest to the camera from the remaining maxima.

When the segmented amplitude presentation is combined with the segmented depth map for the final segmentation, only those pixels are regarded as ones of the foreground which had been allocated to the foreground both in the amplitude presentation and the depth map. That is, the intersection of all of those pixels is used, which are not excluded by one of the two threshold exceedances.

Preferably, the largest contiguous segment of foreground pixels is searched by means of methods known per se, and only pixels of this segment are finally allocated to the foreground, whereas all other pixels are regarded as belonging to the background. A result of such a segmentation is exemplarily shown at the bottom of FIG. 1. This process step is useful for the segmentation if other objects or persons exist relatively closely behind the person to be estimated. If the target person stands evidently isolated and this fact is known, the search for contiguous segments may be skipped.

The identified foreground pixels may be regarded as representing scan points of the visible surface—of the front side—of the person in front of the camera.

As the intrinsic parameters of the camera such as focal length and size of the pixels are known, the process of imaging can be reversed by means of the depth values measured by the TOF camera. This allows the determination, for each pixel, of the 3D space coordinates of that point within the scene, which was mapped onto that pixel. For a pixel having the pixel coordinates (x, y) and the related depth value r, the relevant 3D space point x is obtained by means of the following formula:

$$\overline{x} = r \frac{((c_x - x) \cdot s_x, (c_y - y) \cdot s_y, f)^T}{\|((c_x - x) \cdot s_x, (c_y - y) \cdot s_y, f)^T\|_2} \tag{1}$$

where $(c_x, c_y)$ denotes the pixel coordinates of that point at which the optical axis of the camera meets the image sensor. The parameters $s_x$ and $s_y$ indicate the height and depth of the pixels, respectively, and f is the focal length of the lens. The operator transposes a line vector and $\|\cdot\|_2$ describes the Euclidian norm.

If the above formula is applied to all foreground pixels of the segmented image, a 3D aggregate of points is obtained, which represents the three-dimensional shape of the person in front of the camera.

This approach has two essential advantages:

(i) The presentation is scale-invariant, as the person in the three-dimensional space has always the same size, irrespective of his or her distance from the camera.

(ii) Parts of the body, which are extended in front of the upper part of the body towards the camera and partially hide it, may be easily found nevertheless due to the variation of the depth values. However, this piece of information gets lost in 2D projections of standard cameras, causing there much more complex problems.

In the second step of the method according to the invention, a simplified skeleton model is fit into the 3D aggregate of points, which represents the front side of the person to be estimated. In this case, the skeleton model preferably has a simple design and represents only those anatomical conditions of the human body, which are relevant to pose estimation.

Figure 2:
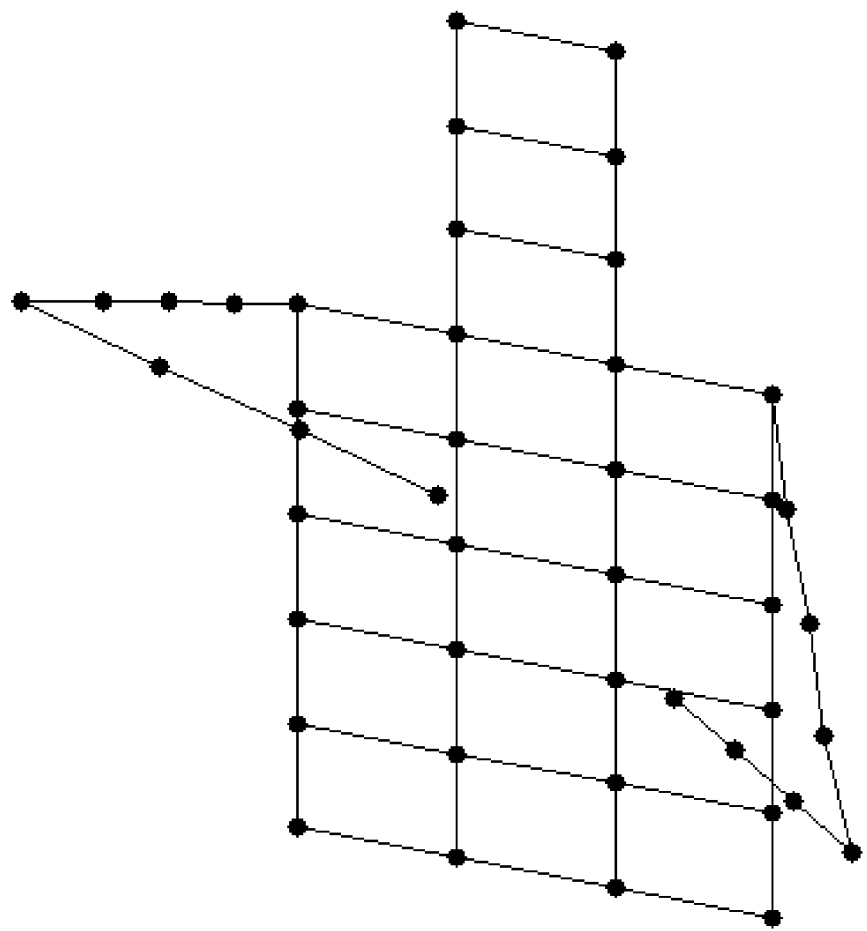
FIG. 2 illustrates the graph structure serving as a simple model of the human body. The edges define the neighborhoods of the SOM.

FIG. 2 illustrates the model which is used here exemplarily. The model is described by a graph consisting of 44 nodes for the upper part of the body, the head and the arms. In this case, the anatomical construction of the body is described by the edges of the graph. For example, the arms are represented by chains of nodes connected in pairs by edges, whereas the upper part of the body is described by a two-dimensional grid. It will be apparent to persons skilled in the art that the concrete configuration of the skeleton model may be selected according to the frame to be evaluated and, therefore, this should not be regarded as limiting the invention. For example, the model may be expanded to the representation of legs without any problem, by adding, at the lower end, two other chains of nodes connected in pairs.

According to the invention, the skeleton model may also be regarded as a self-organizing map (SOM) and may be used accordingly.

Basically, a SOM represents an allocation of data points $\vec{x}$, which is implemented by a neural network, to the so-called codebook vectors $\vec{v}$. It is the aim to find an allocation which represents the input data, like in the case of vector quantization, with the smallest possible root-mean-square error. To do so, a SOM is trained by means of appropriate learning rules, which shifts the codebook vectors within the input space in such a way that the error is minimized.

As an expansion of the vector quantization, a neighborhood structure for the codebook vectors is given to the network. This neighborhood structure comes to fruition in each learning step which the network goes through: A training data point $\vec{x}$ is randomly sampled and the codebook vector $\vec{v}$, which comes closest to it is determined. Now a learning rule is applied to the codebook vector $\vec{v}_*$, which shifts this vector in the direction of the training data point $\vec{x}$. In addition, the neighbors of $\vec{v}_*$, which are defined in the neighborhood structure, are also shifted in the direction of the training data point $\vec{x}$. This causes codebook vectors which are close to each other due to the neighborhood structure to be spatially close to each other also within the input space after the network has been trained. The codebook vectors are hereafter referred to as nodes.

The SOM having nodes and a neighborhood structure, which is used according to the invention, is also shown in FIG. 2. The nodes are shown as points and the edges define the neighborhoods. Therefore, a node has as its neighbors all the nodes to which it is directly connected by an edge.

The SOM is trained by an iterative learning rule for each segmented frame of a video sequence on those pixels which have been allocated to the foreground in advance. For the first frame of a sequence, the pose from FIG. 2, for example, serves as an initialization of the model. During the initialization, the model is shifted into the centroid of the 3D aggregate of points. At the beginning, the size of the model is adapted once to the size of the person in front of the camera. Once it has been selected correctly, it need not be adapted any further during the current process, as the method according to the invention is scale-invariant. In this case, the selection of the initial size of the model is not a particularly critical parameter and the method is not sensitive to relatively large variations during the initialization.

Each training UI all subsequent frames of the sequence is started with the model which has been learned in the preceding frame.

Each adaptation of the model to a new frame includes a complete training of the SOM, i.e. the model learns the structure of the 3D aggregate of points by means of the pattern-by-pattern learning rule where the learning rule is iteratively applied training data point by training data point each time. In this iterative method, data points $\vec{x}$ are randomly sampled from the set of all training data and the model is adapted by means of the following learning rule:

$$\vec{v}_*^{t+1} = \vec{v}_*^t + \epsilon_*^t \cdot (\vec{x} - \vec{v}_*^t) \tag{2}$$

$$\vec{v}_n^{t+1} = \vec{v}_n^t + \epsilon_n^t \cdot (\vec{x} - \vec{v}_n^t) \tag{3},$$

where $\vec{v}_*$ denotes the node which is, in relation to a distance dimension $d(\vec{x}, \vec{y})$, closest to the training data point $\vec{x}$. As the distance dimension, the Euclidean standard $$d(\vec{x}, \vec{y}) = \|\vec{x} - \vec{y}\|_2 = \sqrt{(\vec{x} - \vec{y})^2}$$

is used, for example. The nodes $\vec{v}_n$ represent the neighbors of the node $\vec{v}_*$ as is predetermined by the model of FIG. 2. The values $\epsilon_*^t$ and $\epsilon_n^t$ represent the learning rates for the next node and its neighbors, respectively. In this case, the learning rate $\epsilon_*^t$ is selected as follows:

$$\epsilon_*^t = \epsilon_i \cdot (\epsilon_f/\epsilon_i)_{t/t_{max}} \quad (4),$$

where $t \in \{0, \ldots, t_{max}\}$ describes the current learning step for a frame and $t_{max}$ represents the maximum number of learning steps carried out in this frame. The initial learning rate $\epsilon_i$ and the final learning rate $\epsilon_f$ are exemplarily set to the values 0.1 and 0.05, respectively. The learning rate for the neighbors is set to $\epsilon_n^t = \epsilon_*^t/2$.

The use of this learning rule cannot always ensure that the neighborhood structure of the model in relation to the extremities, that is, the arms in this case, is maintained. The following example is intended for clarification: The hands of a person touch each other in front of the upper part of his or her body. If the hands are moved away from each other again, it may happen, for example, that the model uses the last node of the left arm to represent data points which actually belong to the right hand. Now this may result in the fact that the last node of the left model arm is continued to be attracted by points of the right hand, even though the hands have already moved farther away from each other. The left arm seems to extend through a part of the space in which no data points exist at all.

Basically, the learning rule of the SOM is able to solve this problem over the time. However, only a very small number of learning steps is carried out per frame to ensure a good running time, which may temporarily result in a wrong estimation of the pose.

To avoid this problem, the above-mentioned rules can be expanded in a simple manner so that the learning process in the scenario described will be successful more rapidly. This expansion prevents adjacent nodes from moving away farther than a predetermined distance from each other. This is achieved with the following rule, which is applied after the actual learning rules from equations (2) and (3) if the distance $d(\vec{v}_*, \vec{v}_n^a)$ exceeds a predetermined threshold value $\phi$:

$$\vec{v}_* = \vec{v}_n^a + \phi \cdot \frac{(\vec{v}_* - \vec{v}_n^a)}{\|\vec{v}_* - \vec{v}_n^a\|_2}, \quad (5)$$

where $\vec{v}_n^a$ represents a definite neighbor of the node $\vec{v}_*$, which is referred to as an anchor. The rule ensures that the distance between the node $\vec{v}_*$ and its anchor will never exceed $\phi$. In this case, the threshold value $\phi$ depends on the scaling of the model. The anchor of the node is each time defined as that neighbor node which, in relation to the graph structure of the model, is on the shortest path on the way towards the center of the upper part of the body in the model, i.e. it is that neighbor node which is connected to the center of the upper part of the body by the least number of edges.

Figure 3:
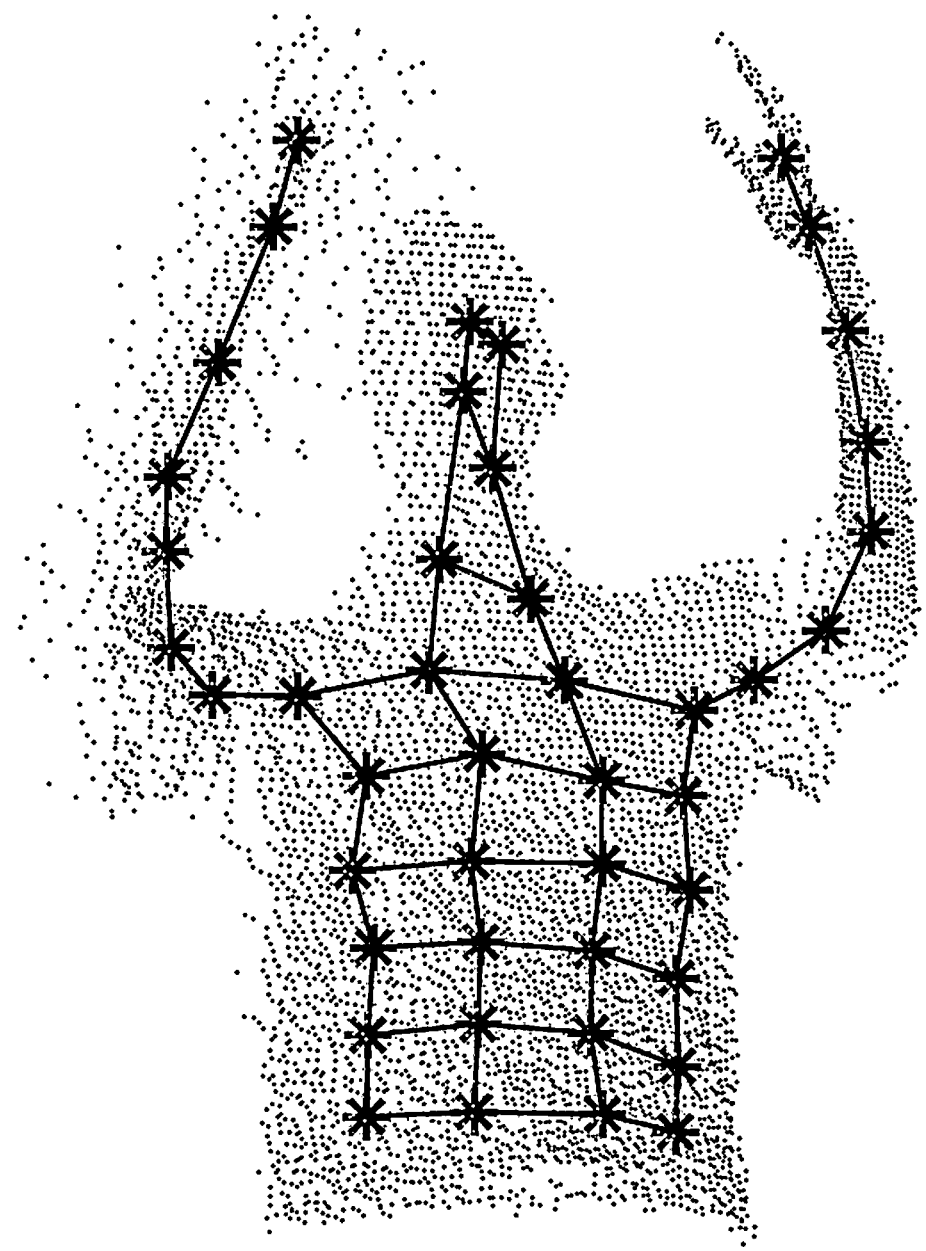
FIG. 3 illustrates the aggregate of points of scan points of the visible surface of a person in front of the camera. The graph structure represents the model for the estimation of the pose, which is put into the data by the SOM learning rule.

An exemplary estimation of the pose is shown in FIG. 3. This figure shows the aggregate of points for the foreground pixels of the segmented image at the bottom of FIG. 1. The model adapted to the data is drawn here into the aggregate of points. It can be seen that the model reflects the anatomy of the person correctly. For example, the upper part of the body is well covered by the two-dimensional grid, some bones extend into the head and the two one-dimensional chains of nodes follow the arms. Therefore, the positions of essential parts of the body such as the hands, for example, can be directly taken from the corresponding nodes of the 3D model.

Figure 4:
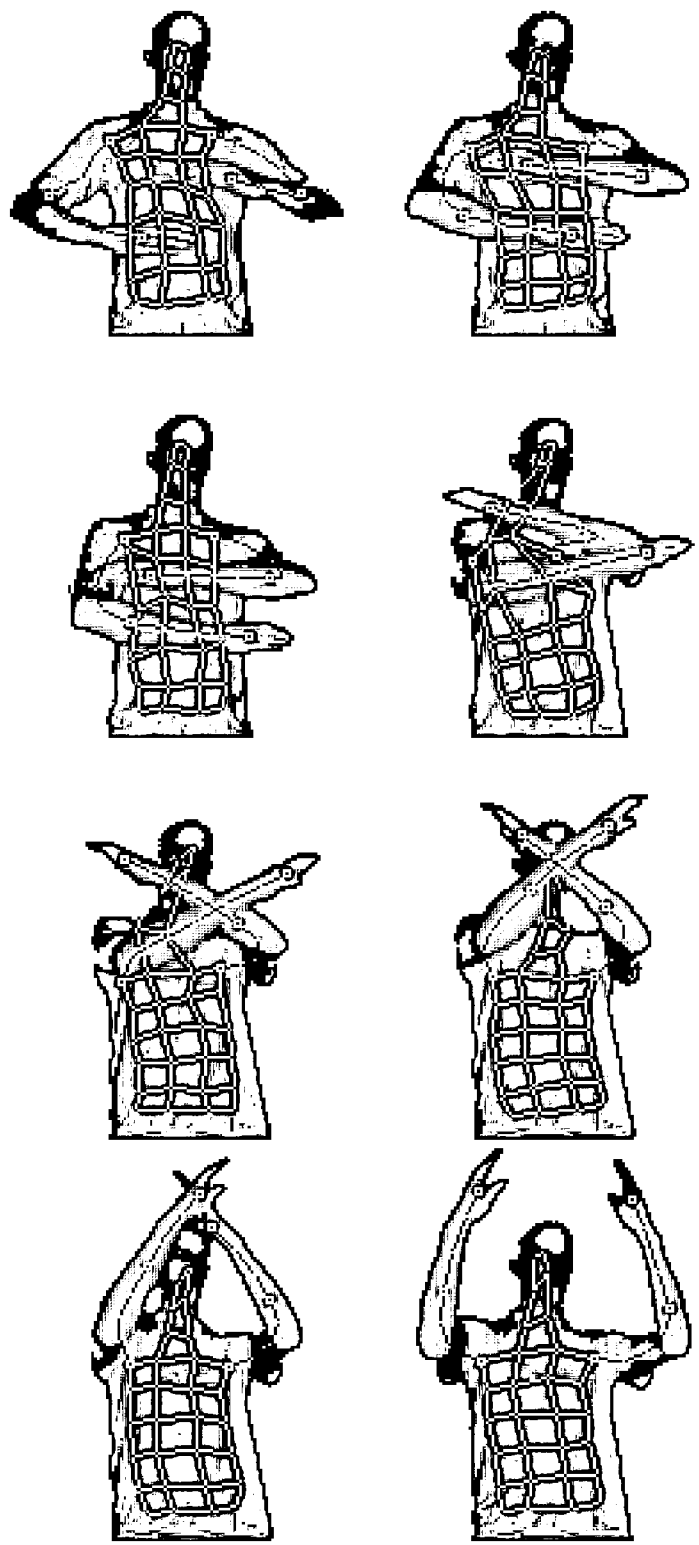
FIG. 4 is a selection of frames from a video sequence, which shows a sequence of gestures. The model by which the pose is estimated is drawn into each frame as a 2D projection. The edges of the model, which belong to the head and to the upper part of the body, are drawn in white, whereas the edges of the arms are shown in black.

Finally, FIG. 4 shows a number of gestures of a video sequence. Each of these frames shows the segmented amplitude presentation and the 2D projection of the model which was drawn in the presentation. The model is able to follow the arms even in difficult situations where the arms are folded closely in front of the upper part of the body. The model is also able to reliably estimate the position of the head, even though a large part of the head is hidden behind the arms in some frames.

An essential advantage of the method according to the invention is that the training of the model for each new frame is completed very rapidly. It could be determined empirically that only a very small amount of data from the 3D aggregate of points has to be used during the training, even if the person in front of the camera executes very fast movements. FIG. 3 contains approximately 6500 foreground pixels. However, only about $t_{max}=650$ data points are randomly sampled and are used in a random order for the training of the SOM by the pattern-by-pattern learning rule. Therefore, the computing expenditure of the method is very small and the pose can be estimated at a frame rate of up to 25 frames per second on a 2.0 GHz PC.

Basically, the method according to the invention can be expanded to any kind of movable objects whose poses are to be estimated three-dimensionally. The combination of TOF camera data and the use of a SOM allows a simple and efficient implementation if there exist restricted movement opportunities for object elements, which can be simulated by a SOM having nodes and a neighborhood structure. This is particularly true if the objects to be estimated are known to have rigidly interconnected elements which are at the same time designed in such a way that they are movable in relation to each other. The human body is in the sense of the invention only one example of such an object.

In case of the estimation of the human pose, the method allows the real-time-capable detection of human gestures. First, the system directly allows the interpretation of pointing gestures, as the positions of the head and hand within the space are known. This allows to identify the direction in which pointing is done, by defining a beam along the hand, which originates from the head. This beam intuitively corresponds to the direction of pointing. If the space coordinates of the object at which pointing is done are additionally known, these may be used to exactly determine the area at which pointing is done. A presentation using PowerPoint slides may be used as an example, where a laser pointer is replaced with a virtual laser pointer, i.e. a red point is shown at that spot on the projected slides, at which the speaker points.

Second, the method according to the invention can be used to develop a system for the detection of more complex gestures on the basis of visual space-time features. The evaluation of such space-time features demands a high processing power of the system. If the positions of some landmarks such as the hands are known, the evaluation of the space-time features can be confined to just those regions in which the hands exist. In addition, the knowledge of the relative positions of the landmarks allows the detected space-time features to be put in relation to each other into a larger context, making the detection of the gestures more unique and hence reliable. A method configured in such a way is then able to detect complex gestures which may be used as an input into a computer-assisted system. Such systems may range from technical control systems in medical and industrial fields, information terminals and multimedia systems for home use to computer games.

What is claimed is:

1. A method for real-time-capable computer-assisted analysis of an image sequence containing a variable pose of an object composed of interconnected elements movable in relation to each other, wherein the frames of the image sequence have been recorded by a distance measuring camera and are processed by a computer and the frames have brightness and distance data as functions of pixel coordinates of the camera for each frame of the sequence; the method comprising:
   (a) the computer detecting the pixels of a frame which map the object;
   (b) the computer calculating a three-dimensional (3D) aggregate of points within a virtual space, which represents that surface of the object which is visible for the camera, by calculated projection of object-mapping pixels into such a space, taking into account acquired data of a distance from the object;
   (c) the computer fitting a model of the object, which consists of nodes and edges, into the computer-generated 3D aggregate of points for the frame, the nodes representing a selection of elements of the object and the edges representing interconnections of these elements;
   (d) the computer iteratively updating all node positions by using a learning rule for training a self-organizing map with a predetermined number of randomly sampled points of the aggregate of points;
   (e) repeating at least 25 times per second the steps (a) through (d) for each subsequent frame of the sequence, the result of step (d) of the preceding frame being used respectively for the fitting process in step (c);
   (f) the computer determining the changing pose from positions of predetermined nodes of the model, which have been detected in at least representative frames of the image sequence;
   (g) wherein the node positions of the model are updated in iteration steps, one point x being randomly sampled for the predetermined number of points of the 3D aggregate of points in each iteration step and all nodes being shifted towards x; and
   (h) the degree of the shift being largest for the node which had the smallest distance from x prior to the iteration step wherein the number of the randomly sampled points x or that of the iteration steps is about 10% of the total number of the points within the aggregate of points.

2. The method according to claim 1, wherein the camera pixels onto which the object is mapped are determined by an image segmentation of the image sequence of the TOF camera.

3. The method according to claim 2, wherein two threshold values for brightness and depth data of the TOF camera are determined for each frame and a contiguous region of camera pixels is identified whose measurement data are larger than the brightness threshold value and are less than the depth threshold value.

4. The method according to claim 3, wherein the brightness data are plotted in a histogram and two accumulation points are identified and the brightness threshold value is selected in such a way that it is between the accumulation points.

5. The method according to claim 3, wherein the depth data are plotted in a histogram and at least two accumulation points are identified and the depth threshold value is selected in such a way that it is between the accumulation point of the least depth and the other ones.

6. The method according to claim 1, wherein the degree of the shift of all nodes is set in such a way that it decreases with the number of iteration steps.

7. The method according to claim 1, wherein prior to each iteration step, for the first node having the smallest distance from the sampled point x, a second node is selected which is a neighbor of the first node and whose distance from the first node does not exceed a predetermined value during the shift of the nodes.

8. The method according to claim 1, wherein the estimated pose serves as a user input for controlling a computer-assisted system.

9. The method according to claim 8, wherein the computer-assisted system represents a technical control system in the medical or industrial field.

10. The method according to claim 8, wherein the computer-assisted system represents an information terminal.

11. The method according to claim 8, wherein the computer-assisted system represents a multimedia system for home use.

12. The method according to claim 8, wherein the computer-assisted system represents a computer game.

13. A computer system for real-time-capable computer-assisted analysis of an image sequence containing a variable pose of an object composed of interconnected elements movable in relation to each other, wherein the frames of the image sequence have been recorded by a distance measuring camera so that they are processed by the computer system and the frames have brightness and
   distance data as functions of pixel coordinates of the camera for each frame of the sequence, the computer system comprising:
   a detecting unit adapted to perform the step of (a) detecting the pixels of a frame which map the object;
   a calculating unit adapted to perform the step of (b) calculating a three-dimensional (3D) aggregate of points within a virtual space, which represents that surface of the object which is visible for the camera, by calculated projection of object-mapping pixels into such a space, taking into account acquired data of a distance from the object;
   a fitting unit adapted to perform the step of (c) fitting a model of the object, which consists of nodes and edges, into the computer-generated 3D aggregate of points for the frame, the nodes representing a selection of elements of the object and the edges representing interconnections of these elements;
   an updating unit adapted to perform the step of (d) iteratively updating all node positions by using a learning rule for training a self-organizing map with a predetermined number of randomly sampled points of the aggregate of points;
   a determination unit adapted to perform the step of (f) determining the changing pose from positions of predetermined nodes of the model, which have been detected in at least representative frames of the image sequence,
   wherein the computer system is adapted to cause its units to
   (e) repeat at least 25 times per second the steps (a) through (d) for each subsequent frame of the sequence, and to cause the fitting unit to use the result of the repetition of steps (a) through (d) of the preceding frame being used respectively for performing process in step (c);
   wherein the node positions of the model are (q) updated in iteration steps, one point x being randomly sampled for the predetermined number of points of the 3D aggregate of points in each iteration step and all nodes being shifted towards x; and
   the degree of the shift being largest for the node which (h) had the smallest distance from x prior to the iteration step wherein the number of the randomly sampled points x or that of the iteration steps is about 10% of the total number of the points within the aggregate of points.

14. A non-transitory computer-readable medium storing instructions that, when executed by a processor of a computer system for real-time-capable computer-assisted analysis of an image sequence, cause the computer system to:
   (a) detect the pixels of a frame which map an object, said object being comprised in said image sequence which contains a variable pose of the object composed of interconnected elements movable in relation to each other wherein the frames of the image sequence have been recorded by a distance measuring camera so that they are processed by a computer and the frames have brightness and distance data as functions of pixel coordinates of the camera for each frame of the sequence
   (b) calculate a three-dimensional (3D) aggregate of points within a virtual space, which represents that surface of the object which is visible for the camera, by calculated projection of object-mapping pixels into such a space, taking into account acquired data of a distance from the object;
   (c) fit a model of the object, which consists of nodes and edges, into the computer-generated 3D aggregate of points for the frame, the nodes representing a selection of elements of the object and the edges representing interconnections of these elements;
   (d) iteratively update all node positions by using a learning rule for training a self-organizing map with a predetermined number of randomly sampled points of the aggregate of points;
   (e) repeat at least 25 times per second the steps (a) through (d) for each subsequent frame of the sequence, the result of step (e) of the preceding frame being used respectively for the fitting process in step (c);
   (f) determine the changing pose from positions of predetermined nodes of the model, which have been detected in at least representative frames of the image sequence
   (g) wherein the node positions of the model are updated in iteration steps, one point x being randomly sampled for the predetermined number of points of the 3D aggregate of points in each iteration step and all nodes being shifted towards x; and
   (h) the degree of the shift being largest for the node which had the smallest distance from x prior to the iteration step wherein the number of the randomly sampled points x or that of the iteration steps is about 10% of the total number of the points within the aggregate of points.

* * * * *